(12) United States Patent
Laivins et al.

(10) Patent No.: US 7,257,873 B2
(45) Date of Patent: Aug. 21, 2007

(54) METHOD FOR MANUFACTURING HAND GUARDS

(76) Inventors: Kenneth T. Laivins, 4393 Blacks Rd., Hebron, OH (US) 43025; Glen A. Laivins, 4301 Blacks Rd., Hebron, OH (US) 43025

( * ) Notice: Subject to any disclaimer, the term of this patent is extended or adjusted under 35 U.S.C. 154(b) by 627 days.

(21) Appl. No.: 10/769,832

(22) Filed: Feb. 2, 2004

(65) Prior Publication Data

US 2004/0217243 A1    Nov. 4, 2004

Related U.S. Application Data

(60) Provisional application No. 60/443,929, filed on Jan. 31, 2003.

(51) Int. Cl.
| | |
|---|---|
| *B23P 17/00* | (2006.01) |
| *B21D 53/88* | (2006.01) |
| *B21D 53/00* | (2006.01) |
| *B21D 53/08* | (2006.01) |
| *B21J 15/10* | (2006.01) |
| *A45C 3/00* | (2006.01) |
| *B21F 11/00* | (2006.01) |

(52) U.S. Cl. .................. 29/412; 29/897.2; 29/34 R; 16/436; 72/129; 72/130

(58) Field of Classification Search ............ 29/17.2, 29/34 R, 412, 469.5, 890.08, 897.2; 72/129, 72/130, 405.06; 16/436
See application file for complete search history.

(56) References Cited

U.S. PATENT DOCUMENTS

| | | | | |
|---|---|---|---|---|
| 1,982,404 A | * | 11/1934 | Stoner | ................. 29/412 |
| 4,563,802 A | * | 1/1986 | Benteler et al. | ......... 29/890.08 |
| 4,590,652 A | * | 5/1986 | Harwood | ............. 29/890.08 |
| 6,055,788 A | * | 5/2000 | Martin et al. | ............. 52/731.6 |
| 6,131,266 A | * | 10/2000 | Saunders | ................. 29/557 |
| 6,293,134 B1 | * | 9/2001 | Johnson | .................. 72/335 |
| 6,609,649 B1 | * | 8/2003 | Barnholt et al. | ........... 228/171 |
| 6,799,371 B2 | * | 10/2004 | Liu | ..................... 29/894.37 |
| 7,103,954 B2 | * | 9/2006 | Krish et al. | ................ 29/412 |
| 2002/0138987 A1 | * | 10/2002 | Nees | ................. 29/897.312 |
| 2005/0000089 A1 | * | 1/2005 | Fu | ............................ 29/739 |
| 2006/0156526 A1 | * | 7/2006 | Tobler | ....................... 29/412 |
| 2006/0200987 A1 | * | 9/2006 | Tai | .......................... 29/889.7 |

\* cited by examiner

*Primary Examiner*—David P. Bryant
*Assistant Examiner*—Alex Taousakis
(74) *Attorney, Agent, or Firm*—Mueller Smith & Matto, LPA

(57) ABSTRACT

The present invention addresses an ATV clamp assembly. The clamp assembly includes a central body having a handlebar leg and a hand guard leg, a handlebar clamp pivotally connected to the handlebar leg and removably clamped to the ATV's handlebar and a hand guard member pivotally connected to the hand guard leg and removably connected to the hand guard. Also addressed is a motorcycle clamp assembly including a handlebar clamp removably connected to the motorcycle's handlebar and having a generally rectangular shape with rounded ends and having a tapered aperture configured to mate with handlebar's tapered portion, and a hand guard member connected to the hand guard and pivotally connected to the handle bar clamp. A method for manufacturing hand guards is disclosed. Using that method, one or more bends are cut in the X-Y plane and a bender is used to form at least one bend in the Z-axis.

9 Claims, 7 Drawing Sheets

METHOD FOR MANUFACTURING HAND GUARDS

CROSS-REFERENCE TO RELATED APPLICATIONS

This application claims priority to a provisional application, Ser. No. 60/443,929, filed Jan. 31, 2003, the disclosure of which is expressly incorporated herein by reference.

BACKGROUND OF THE INVENTION

Clamp assemblies exist for connecting a hand guard to the handlebar of all-terrain vehicles (ATVs). In the past, however, such clamps were specifically designed to be used with a particular model ATV. To meet customer demand for ATV clamps, a store must carry a variety of clamps, which requires a corresponding amount of storage and display space. Specifically designed clamps also are disadvantageous for the ATV owners. When clamps are designed to fit a specific ATV, the proper clamp must be purchased. As with replacement wiper blades, if the wrong clamp is purchased, the customer must return it to the seller and exchange it for the correct clamp. The same problems exist for motorcycle clamps, which are designed to fit specific motorcycle models.

Hand guards also exist for protecting the rider's hands. These handle guards generally are formed from elongate metal bars, which are bent using a conventional bender to form the desired shape. Using this method, however, each bend represents a structural weakness. More structurally robust handguards and methods for manufacturing them continue to be sought.

BRIEF SUMMARY OF THE INVENTION

The present invention addresses a unique ATV clamp assembly, an improved motorcycle clamp and a method for manufacturing hand guards.

The ATV clamp assembly includes a central body to which are pivotally attached a hand guard connector and a handlebar clamp. The pivoting nature of these components makes the ATV clamp assembly universal such that it can be used with any sport or utility ATV.

The motorcycle clamp assembly includes a handlebar clamp and a hand guard connector pivotally connected together. While prior hand guard connectors generally are tapered at one end, the inventive handlebar clamp accommodates a hand guard clamp of uniform width, which eliminates a structural weakness and provides a motorcycle clamp of greater durability. The motorcycle clamp assembly also is designed to include a tapered inner surface to locate the handlebar clamp on the handlebar. Finally, smooth edges, rounded ends, and flush bolts or screws are provided to protect the rider's hands and knees from otherwise sharp corners and protruding components.

The method for manufacturing hand guards includes providing sheet stock having a surface lying in an X-Y plane and extending a given thickness along a Z-axis. A pattern is formed on the surface of the sheet stock. Apertures are formed through the sheet stock thickness at desired locations. A cutting apparatus then is provided that is used to cut the sheet stock in a desired shape having one or more bends in the X-Y plane. After apertures have been formed and the part cut from the sheet stock, a bender is used to create one or more bends in the hand guard that are outside the X-Y plane. Using the present method, a more structurally robust part can be made.

BRIEF DESCRIPTION OF THE DRAWINGS

For a fuller understanding of the nature and advantages of the present invention, reference should be had to the following detailed description taken in connection with the accompanying drawings, in which.

DETAILED DESCRIPTION OF THE INVENTION

One aspect of the present invention is a clamp assembly for use with a sport or utility type all terrain vehicle (ATV). Clamp assemblies exist for connecting a hand guard to the handlebar of ATVs. In the past, however, such clamps were specifically designed to be used with a particular model ATV. One unique aspect of the clamp assembly of the present invention is that it is universal and can be used with any number of ATV models.

In the past, a store may have carried a number of clamps for each ATV model. One of the advantages realized with the universal design is that a store supplying ATV parts and accessories need only stock a given number of the universal clamp assemblies. This benefits retailers by reducing the amount of storage and display space needed for clamps. The universal clamp also benefits customers. When clamps are designed to fit a specific ATV, the proper clamp must be purchased. As with replacement wiper blades, if the wrong clamp is purchased, the customer must return it to the seller and exchange it for the correct clamp. Thus, the universal clamp assembly provides a convenient alternative for both retailers and customers.

Figure 1:
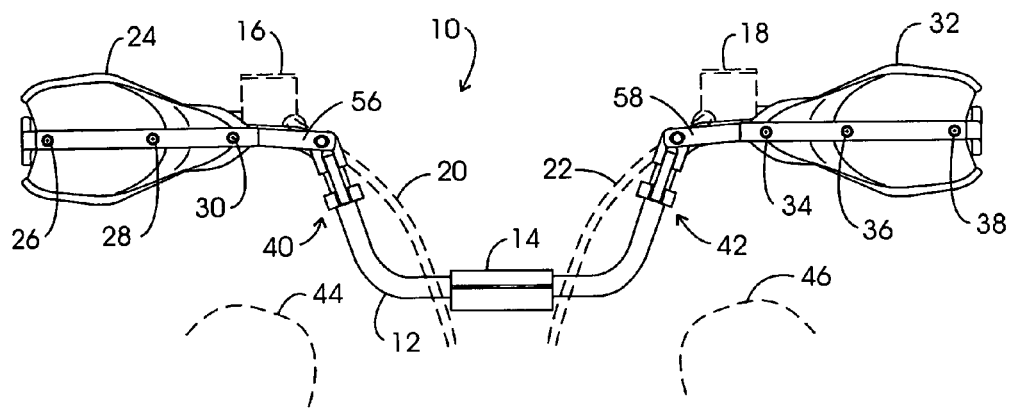
FIG. 1 is a front view of an ATV steering assembly including a pair of ATV clamp assemblies of the invention.

Turning to FIG. 1, the steering assembly of a utility or sport ATV is shown generally at 10. Steering assembly 10 is shown in conventional fashion including a handlebar, 12, attached to the body of the ATV (not shown) by a clamp, 14. A pair of hand brake handles, 16 and 18, are shown in phantom connected to handlebar 12. Brake lines for brake handles 16 and 18 are shown in phantom at 20 and 22, respectively. Also shown in phantom at 44 and 46 are the knees of a rider seated on the body of the ATV.

Figure 2:
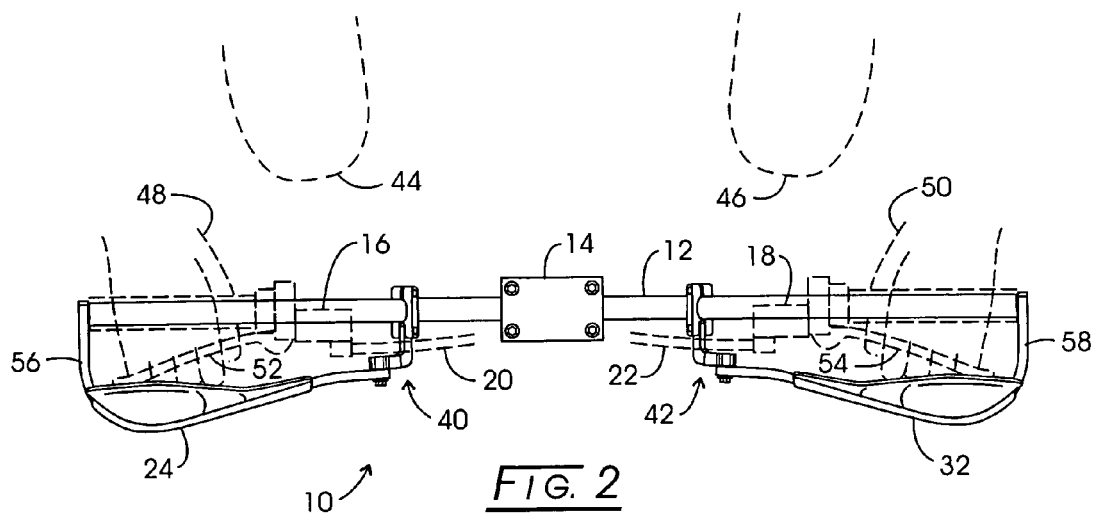
FIG. 2 is a top view of the ATV steering assembly shown in FIG. 1.
Figure 3:
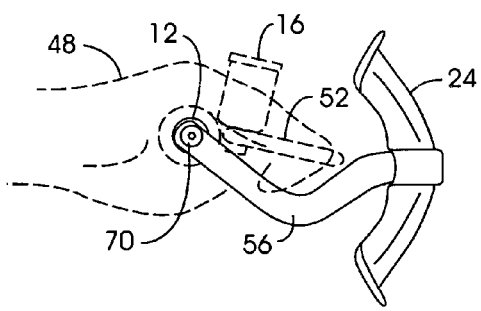
FIG. 3 is an end view of the ATV steering assembly shown in FIG. 1.

Looking additionally to FIG. 2, the rider's hands also are shown in phantom at 48 and 50. The rider's hands are positioned about the grips, 52 and 54, of brake handles 16 and 18, respectively. Throught this application, items identified in prior figures will retain that numeration. Protecting the rider's and the ATV's brake handles are a pair of hand guard and shield assemblies. For example, the rider's right hand, 48, is protected by a hand guard, 56 to which is attached a shield, 24. Similarly, the rider's left hand, 50, is protected by a hand guard, 58, and a shield 32. Looking back to FIG. 1, shield 24 is seen to be connected to hand guard 56 by three screws located at 26, 28, and 30. Shield 32 is connected by screws in like manner to hand guard 58 by three screws 34, 36, and 38. Looking briefly to FIG. 3, a partial view of steering assembly 10 is shown. From this view, the spatial relationship of the right hand, 48, and brake handle 16 to hand guard 56 and shield 24 may be seen.

Figure 4:
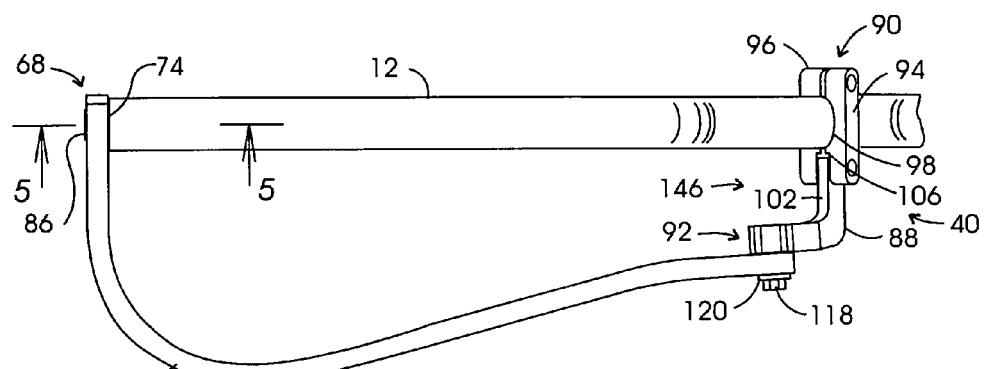
FIG. 4 is a perspective view of a hand guard attached to an ATV handlebar by the clamp assembly of the invention.
Figure 5:
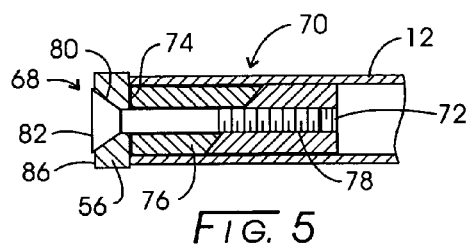
FIG. 5 is a cross-sectional view taken through the line 5-5 in FIG. 4 and showing a connector assembly for attaching one end of a hand guard to an ATV handlebar.
Figure 5A:
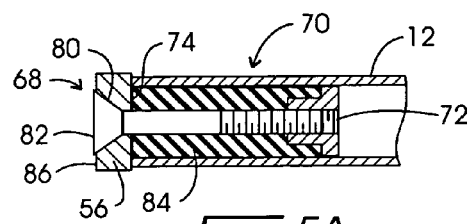
FIG. 5A is an alternative embodiment of the connector assembly shown in FIG. 5.
Figure 6:
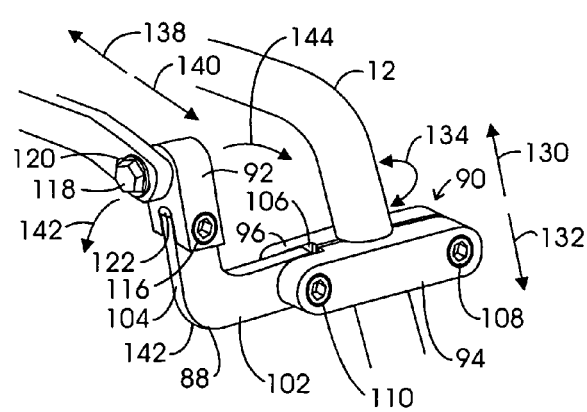
FIG. 6 is a perspective view of the clamp assembly of the invention shown connecting the opposite end of a hand guard to an ATV handlebar.

Turning now to FIGS. 4 and 6, the connection of hand guard 56 to handlebar 12 is illustrated. Hand guards of the type illustrated herein are specifically configured for either the right side or the left side of the ATV handle bar. Hand guard 56 shown in FIG. 4 is a right side configuration. One end of hand guard 56 is connected to handlebar 12 at 68. Looking to FIG. 5, connection 68 is shown in greater detail. The end of handlebar 12 includes a cavity, 70, that extends between an inner wall, 72 and an outer surface, 74, of handlebar 12. A bar end, 76, having a threaded channel 78, is inserted into cavity 70 such that it abuts inner wall 72. To connect that end of hand guard 56 to handlebar 12, a tapered aperture, 80, in hand guard 56 is aligned with channel, 78. A screw is inserted through aperture 80 and fastened within channel 78. Bar end 76 is formed of an alloy material, such as aluminum. Alternatively, a rubber bar end may be used. FIG. 5A shows a rubber bar end, 84, inserted within cavity 70. It should be noted that for either embodiment, the head of screw 80 is flush with the edge, 86, of hand guard 56.

The opposite end of hand guard 56 is attached to handlebar 12 with unique ATV clamp assembly 40. An enlarged view of clamp assembly 40 is shown in FIG. 6. Clamp assembly 42, located on the opposite side of handlebar 12, is identical to clamp assembly 40. ATV clamp assembly 40 includes a handlebar clamp, shown generally at 90, a central body, 88, and a hand guard connector, shown generally at 92. Handlebar clamp 90 is formed of a pair of jaw members 94 and 96, each having a concave surface 98 and 100 (not shown). Each jaw member also includes a pair of apertures, the apertures of jaw member 96 each being threaded to receive a screw. To attach handlebar clamp 90 to handle bar 12, jaw members 94 and 96 are positioned about handlebar 12 and a screw, 108, is inserted through jaw member 94 and fastened to jaw member 96.

Before securing a second screw, central body 88 is positioned with respect to handlebar clamp 90. Central body 88 is integrally formed and includes a handlebar leg 102 and a hand guard leg 104 (FIG. 6). One end of handlebar leg 102 includes an aperture. Looking to the portion of jaw members 94 and 96 below handlebar 12, the jaw members are configured to form a slot, 106. Handlebar leg 102 is inserted within slot 106 and is pivotally connected to handlebar clamp 90 by securing the second screw, 110 (FIG. 6). Screw 110 is inserted through jaw member 94 and the aperture of handlebar leg 102, and fastened to jaw member 96.

Attached to hand guard leg 104 of central body 88 is hand guard connector 92. Hand guard connector 92 is seen to have a generally U-shaped configuration and includes a slot 122. Hand guard leg 104 is inserted within slot 122 and is pivotally connected to hand guard leg 104 by a screw 116 that extends through an aperture in leg 104 and apertures in connector 92. The opposite end of connector 92 is connected to hand guard 56 by a screw 118 and an associated washer 120. The components of ATV clamp assembly 40 preferably are formed of strong, yet light weight, metal, such as, aluminum, an aluminum alloy, titanium, or other such metals. Alternatively, the components may be formed of plastic, ceramic or other suitable material.

The ability of the ATV clamp assembly 40's various parts to rotate and pivot is what enables clamp assembly 40 to be used with a variety of ATVs. Such movement of the various parts is illustrated by directional arrows in FIG. 6. For example, before screws 108 and 110 are tightened, handlebar clamp 90 is capable of moving up and down handlebar 12, as indicated by directional arrows 130 and 132. Handlebar clamp 90 also can be rotated about handlebar 12 as indicated by arrow. The pivoting connection between handlebar leg 102 and handlebar clamp 90 permits movement as indicated by directional arrows 138 and 140. The pivotal connection between hand guard leg 104 and hand guard connector 92 allows movement as indicated by directional arrows 142 and 144. Finally, a slot, 122, located on hand guard 56 provides for accommodation in the connection of hand guard 56 to hand guard connector 92. Once all of the components are properly located, the clamp assembly is secured in place by tightening screws 108, 110, 116, and 118.

As another feature of the invention, clamp assembly 90's component parts have been designed with smooth edges and rounded corners to protect the hands and knees of the rider. For example, note the rounded ends of handlebar clamp 90 at 138 and 140. Note also the rounded portion of central body 88 at 142 and the rounded end of hand guard connector 92 at 144.

In addition to providing pivoting connections with handlebar clamp 90 and hand guard connector 92, central body 88 also provides a brake line accommodating central extension area. This area is indicated generally at 146 in FIG. 4.

Figure 7:
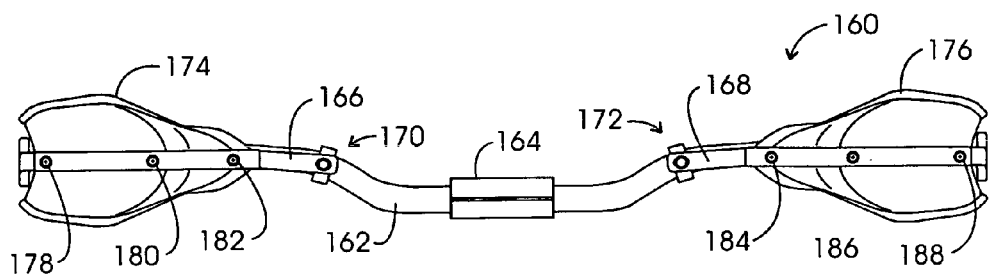
FIG. 7 is a front view of a motorcycle steering assembly including the motorcycle clamp assembly of the invention.
Figure 8:
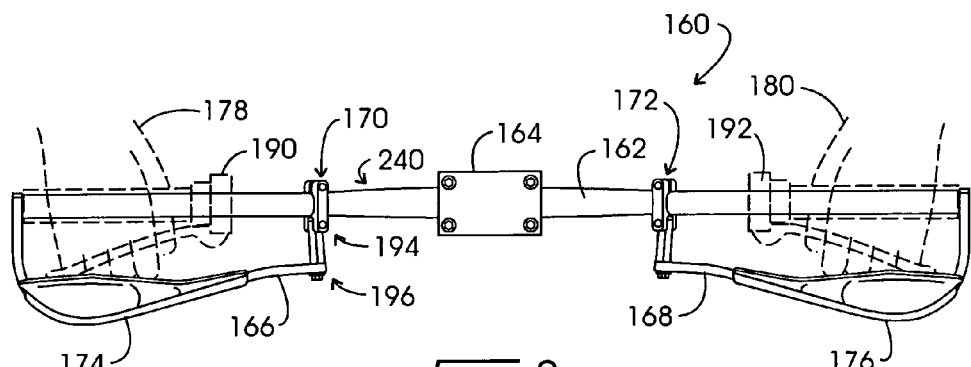
FIG. 8 is a top view of the motorcycle steering assembly shown in FIG. 7.

Turning now to FIG. 7, the improved motorcycle clamp assembly of the invention is shown in connection with the steering assembly, 160, of a motorcycle. Motorcycle steering assembly 160 includes a motorcycle handlebar, 162, connected to the body of the motorcycle (not shown) by a clamp, 164. Note that the curvature of motorcycle handlebar 162 is less than that of ATV handlebar 12 shown in FIG. 1. Connected to motorcycle handlebar 162 are a pair of hand guards, 166 and 168. These hand guards are attached using a pair of the improved motorcycle clamp assemblies, shown generally at 170 and 172, which will be described in detail below. Attached to hand guards 166 and 168 are shields, 174 and 176. These shields are of conventional design and are attached as shown in FIG. 7 by three screws. For example, shield 174 is attached to hand guard 166 by screws 178, 180, and 182. Likewise, shield 176 is connected to hand guard 168 by screws 184, 186, and 188. As shown in FIG. 8, the shields and hand guards protect the rider's hands, 178 and 180, and the motorcycle's brake handles, the grips of which are shown at 190 and 192.

Figure 9:
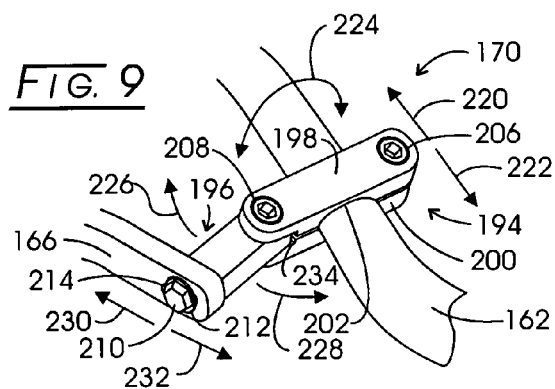
FIG. 9 is a perspective view of the motorcycle clamp assembly of the invention shown connecting one end of a hand guard to a motorcycle handlebar.

As shown in FIG. 8, motorcycle clamp assembly 170 is seen to include a handlebar clamp 194 and a hand guard connector 196. Looking to FIG. 9, these components are shown in greater detail. The motorcycle clamp assembly 172 provided on the opposite side of the motorcycle has an identical construction. Handlebar clamp 194 is formed of a pair of jaw members 198 and 200, each having a concave surface 202 and 204. Each jaw member also includes a pair of apertures, the apertures of jaw member 200 each being threaded to receive a screw. To attach handlebar clamp 194 to handle bar 162, jaw members 198 and 200 are positioned about handlebar 162 and a screw, 206, is inserted through jaw member 198 and fastened to jaw member 200.

It should be noted that jaws 198 and 200 are configured to form a slot 234. One end of hand guard connector 196 is inserted into slot 234 and pivotally connected by inserting a screw, 208, through the second aperture in jaw member 198, through an aperture in connector 196, where it is fastened in the second aperture of jaw member 200. The opposite end of hand guard connector 196 is attached to hand guard 166 by a screw 210 with an associated washer 212.

The movement of the various parts is illustrated by directional arrows. For example, before screws 206 and 208 are tightened, handlebar clamp 194 is capable of moving up and down handlebar 162, as indicated by directional arrows 220 and 222. Handlebar clamp 194 also can be rotated about handlebar 162 as indicated by arrow 224. Because of the pivotal connection made by screw 208, hand guard connector rotates as indicated by arrows 226 and 228. Finally, due to a slot, 214, in hand guard 166, the hand guard may be adjusted with respect to hand guard connector 196 as indicated by arrows 230 and 232.

Figure 11:
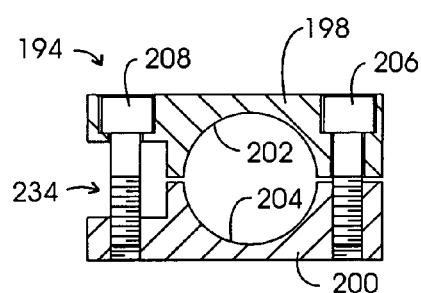
FIG. 11 is a cross sectional view taken through the line 11-11 in FIG. 10 showing an aperture for the motorcycle handlebar, a pair of bolts, and a slot for receiving the hand guard connector of the motorcycle clamp assembly.
Figure 10:
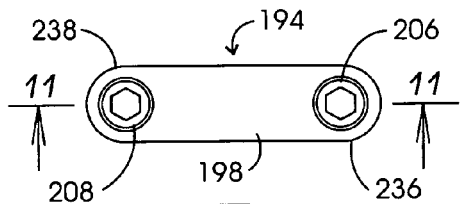
FIG. 10 is a top view of the handlebar clamp of the motorcycle clamp assembly.

Looking to FIG. 10, a top view of handlebar clamp 194 is shown. It may be noted that handlebar clamp 194 has rounded edges as at 236 and 238. Providing edges that are round rather than sharp corners protects the rider's hands and knees. Looking to FIG. 11, a cross sectional view of handlebar clamp 194 is shown. As described above, handlebar clamp 194 includes jaw members 198 and 200, which have curved surfaces, 202 and 204. Connecting the jaw members together are screws 206 and 208. In FIG. 11, slot 234 may be seen in greater detail. In prior motorcycle clamps, the end of hand guard connector 196 was more narrow than the body of connector 196 in order to fit in the slot provided in handlebar assembly. With the present invention, however, slot 234 has been enlarged so that connector 196 will have a generally uniform width. This eliminates the structural weakness present in the prior connectors having a narrowed shape.

Figure 12:
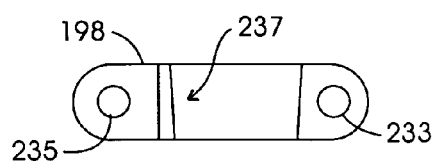
FIG. 12 is a bottom view of the handlebar clamp illustrated in FIG. 10 and showing a taper.

Another advantage of the present motorcycle clamp assembly is that the jaw members interior surfaces are tapered, as shown in FIG. 12, to locate handlebar clamp 194 at the proper position on handlebar 162. FIG. 12 shows the interior surface of one of the jaw members, for example, jaw member 198. Apertures, 233 and 235, are present at the ends of jaw member 198 to receive screws 206 and 208. The taper of jaw member 198 is shown generally at 237. The diameter of standard motorcycle handlebars increases slightly where they are clamped to the body of the motorcycle. This is shown generally at 240 in FIG. 8. Thus, for example, when attaching hand guard 166 to handlebar 162, the proper position of handlebar clamp 194 can be determined by sliding it along handlebar 162 toward clamp 164 until the tapered surfaces of the jaw members fit snugly about handlebar 162.

The components of motorcycle clamp assembly 170 preferably are formed of strong, yet light weight, metal, such as, aluminum, an aluminum alloy, titanium, or other such metals. Alternatively, the components may be formed of plastic, ceramic or other suitable material.

Figure 13:
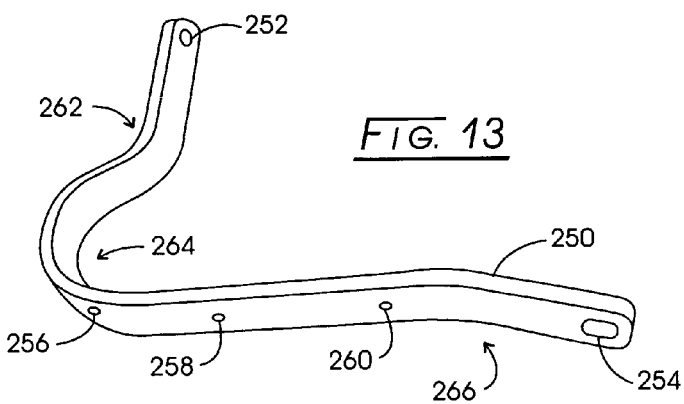
FIG. 13 is a perspective view of a hand guard manufactured in accordance with the method of the invention.

Yet another aspect of the present invention is a method for manufacturing hand guards such as those described previously and such as that shown at 250 in FIG. 13. Hand guard 250 has a tapered aperture 252 where the hand guard is directly connected to a handlebar and a slot, 254, for connecting the opposite side of hand guard 250 to a handlebar with an ATV or motorcycle clamp assembly as previously described. Three bores are provided in handle guard 254 so that a shied can be attached. Attachment of a shield to a hand guard is shown, for example, in FIG. 1 at 178, 180, and 182.

Hand guard 250 is configured having a number of bends. Three such bends are shown generally at 262, 264, and 266. When formed this way, each bend represents an area of structural weakness caused by the stretching of the material in the area of the bend. The inventive manufacturing process can be used to create hand guards having this shape quickly and inexpensively, while simultaneously providing a more structurally robust part.

The advantages of the present method are achieved by providing sheet stock having a surface lying in an X-Y plane and extending a given thickness along a Z-axis. A pattern is formed on the surface of the sheet stock. The pattern includes the shape of the handguard with at least one bend in said X-Y plane and the locations of one or more apertures to be formed through the handguard. The pattern may be formed by directly applying the pattern to the sheet stock or may be formed indirectly, for example, through computer numerical control. The pattern may include the shape and aperture locations for a single handguard or for a plurality of nested handguards, as described below. Once the pattern is formed, or applied, to the sheet stock, apertures are formed through the sheet stock thickness at desired locations in accordance with the pattern. The sheet stock then is cut, also in accordance with the pattern, having one or more bends in the X-Y plane. The cutting may be accomplished using any conventional cutting apparatus including, but not limited to, apparatus for mechanical cutting or for laser cutting. This produces an intermediate part such as that shown at 270 in FIG. 14. After apertures have been formed and the part cut from the sheet stock, a bender is used to create one or more bends in the hand guard that are outside the X-Y plane, e.g., bend 264.

Figure 14:
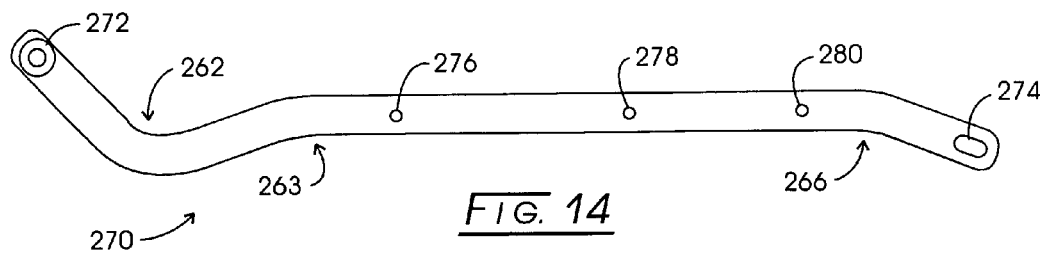
FIG. 14 is perspective view of an intermediate hand guard prior to being bent by a bender.

For example, looking at FIG. 14, intermediate hand guard 270 is shown lying in an X-Y plane. In that figure, three bends in the X-Y plane may be seen. These bends are represented generally at 262, 263, and 266. Looking back to FIG. 13, a fourth bend, 264, is shown. Bend 264 lies outside the X-Y plane. Bends outside the X-Y plane may be either above or below the X-Y plane but need not be orthogonal to it.

Preferably, the pattern of the apertures to be formed and the cutting of the hand guard is achieved using computer numerical control (CNC) apparatus. CNC machines offer improved automation, consistent and accurate work pieces, and increased tool flexibility. While use of a CNC machine is preferred as it provides these benefits, the method described below may be performed manually using conventional tools.

Common manufacturing principles recommend that items sold in pairs be manufactured in pairs. Since, as noted above, a hand guard pair includes a left hand guard and a right hand guard, the method described below involves the formation of 9 pairs of hand guards. Neither the number of guards produced nor whether the hand guards are produced separately or in pairs should be considered limiting of the present invention.

Figure 15:
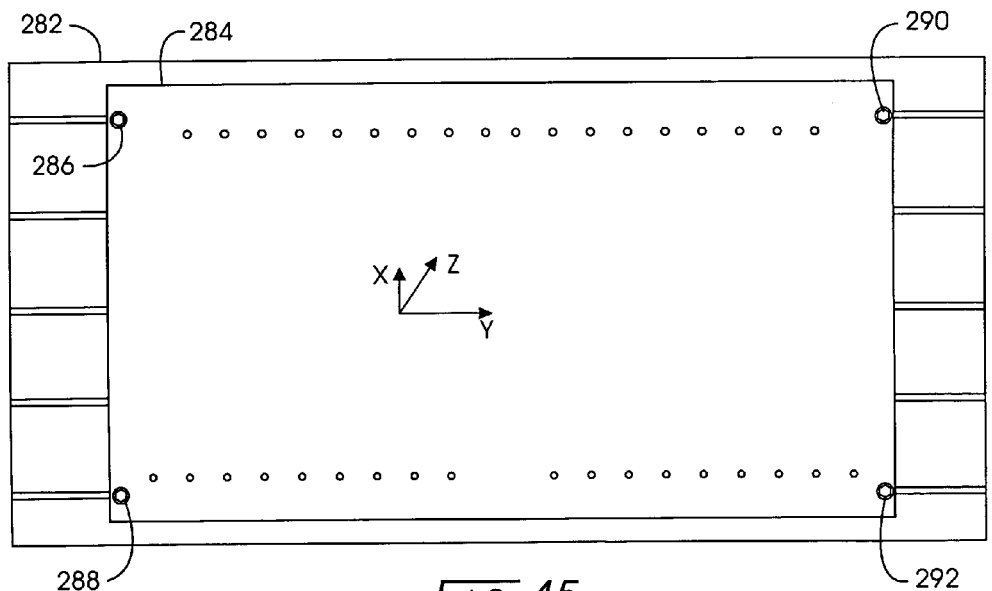
FIG. 15 is a top view of a milling machine table with a jig bolted to it.
Figure 16:
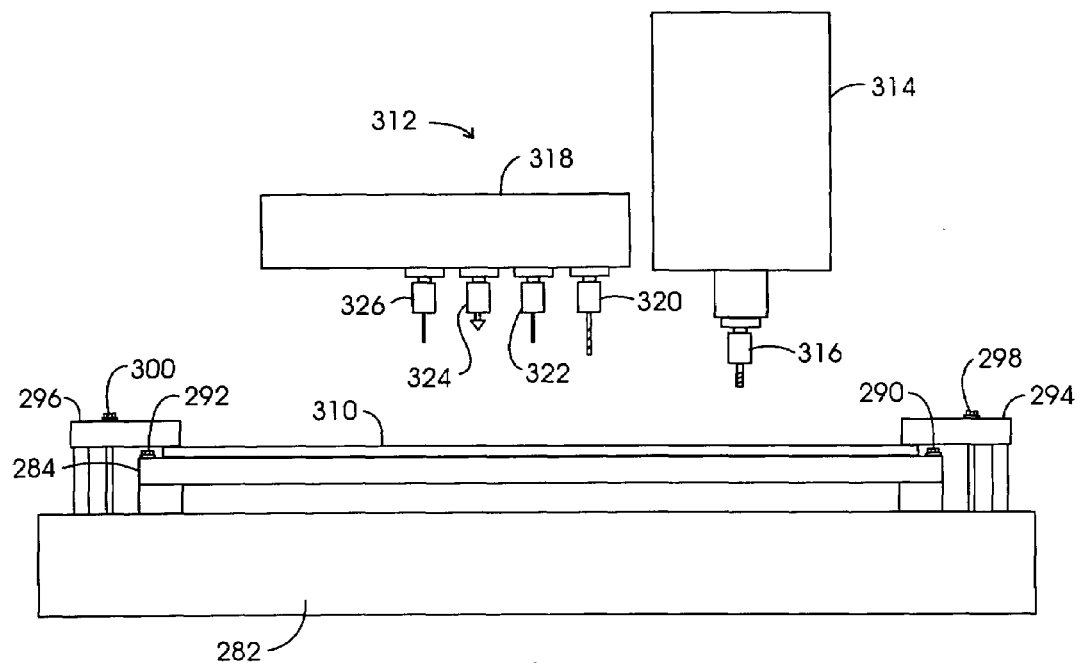
FIG. 16 is an end view of the table shown in FIG. 15 with sheet stock placed atop the jig and with the milling head of a computer numerical control apparatus suspended above the table.

Looking to FIG. 15, a table is provided at 282. A rectangular jig, 284, is attached to table 282 by four bolts, 286, 288, 290, and 292. FIG. 16 is an end view of the table of FIG. 15 with sheet stock, 310, having been attached to the table atop jig 284. Holding sheet stock 310 in place are a pair of clamps, 294 and 296, located at opposite sides of table 282. Clamps 294 and 296 are secured by bolts 298 and 300, respectively. Suspended above table 282 are components of a CNC apparatus or machine indicated generally at 312. CNC apparatus 312 includes a spindle or milling head, 314, at the base of which is a miller, 316. Additional tools are provided in a tool holder, 318. Such tools may include, for example, a large drill, 320, a small drill, 322, a tap, 324, and a taper, 326. An operator may exchange the tool located on milling head 314 with one from tool holder 318 manually or, in more advanced apparatus, the substitution may be computer controlled. Although not shown in the drawings, a computer is provided as part of the CNC apparatus. The computer is connected to milling head 314 and controls its movement with respect to the table and, thus, sheet stock 310 The computer is to direct the milling head to perform the necessary functions, i.e., drilling, cutting, tapering, etc.

Figure 17:
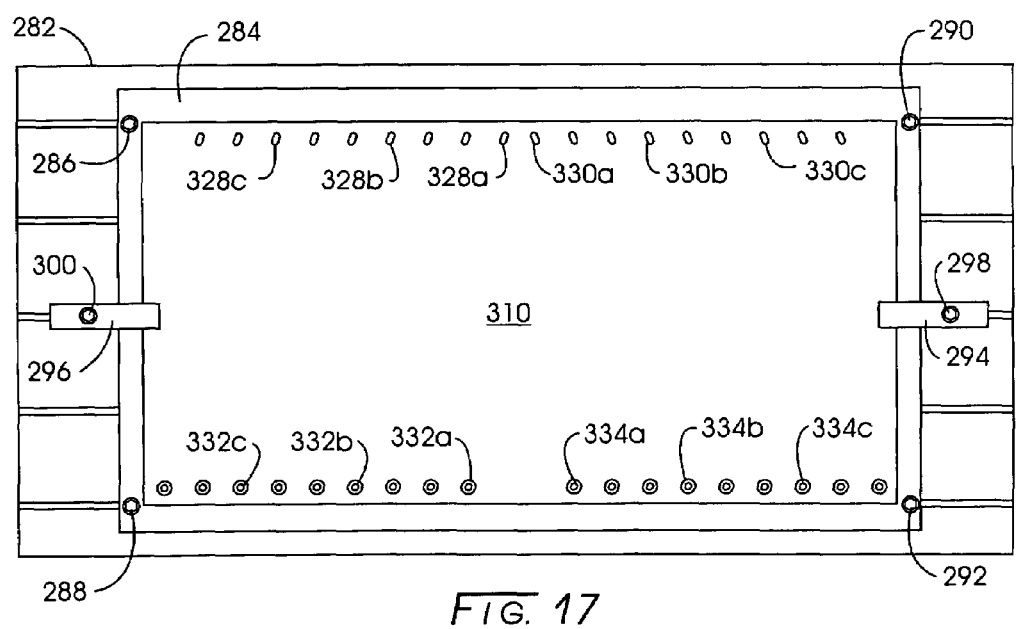
FIG. 17 is a top view of the table and sheet stock of FIG. 16 after a plurality of slots and tapered apertures have been formed in the sheet stock.
Figure 18:
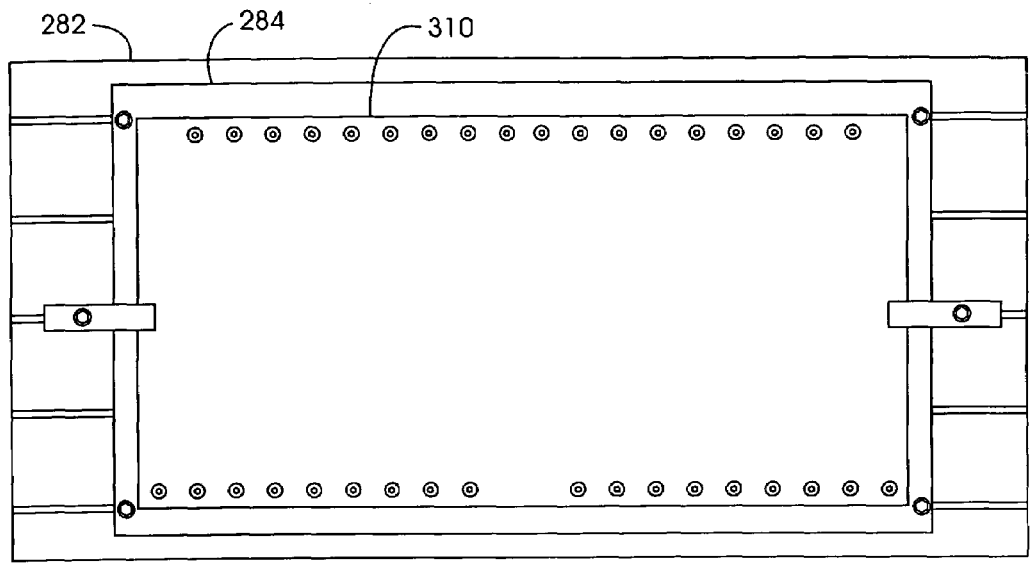
FIG. 18 is a top view of the apparatus shown in FIG. 17 with bolts having been placed in the slots and tapered apertures to secure the sheet stock to the table.

FIG. 17 shows sheet stock 310 after the first function has been performed. Using either miller 316 or large drill 320, a series of 18 slots are formed in a row along the top edge of sheet stock 310. The first nine slots, three of which are identified as 328*a-c*, are formed in what will be three right hand guards. The remaining nine slots, three of which are identified as 330*a-c*, are formed in what will be three left hand guards. These slots correspond to slot 274 of hand guard 270 in FIG. 14. After forming the slots, 18 tapered apertures are formed along the bottom edge of sheet stock 310. Large drill 320 is used to form an aperture or bore through sheet stock 310 and then taper tool 324 is used to form a taper about each aperture. 18 tapered apertures have been formed. The first 9, three of which are identified as 332*a-c*, are formed in the right hand guards, while the second 9, three of which are identified as 334*a-c*, are formed in the left hand guards. These tapered apertures correspond to the tapered aperture shown at 272 in FIG. 14. While the slots have been described as having been formed before the tapered apertures, these steps could be reversed without going beyond the scope of the invention.

Figure 19:
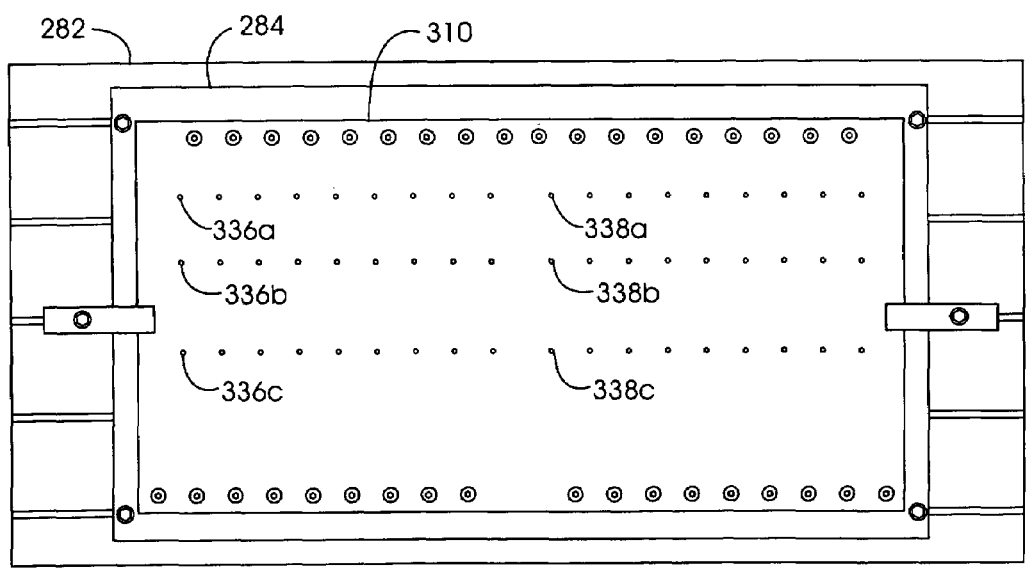
FIG. 19 is a top view of the apparatus shown in FIG. 18 with additional apertures having been formed in the sheet stock.

Following the formation of the slots and tapered apertures, bolts are inserted in each of the slots and the tapered apertures to secure sheet stock 310 to jig 284 prior to performance of the cutting routine. An array of relatively small apertures then is drilled and tapped using small drill 322 and tap tool 324. Looking back to FIG. 14, these apertures are, for example, apertures 276, 278, and 280 in hand guard 270. In FIG. 19, a right hand guard will include, for example, apertures 336*a*, 336*b*, and 336*c*. Similarly, a left hand guard will include, for example, apertures 338*a*, 338*b*, and 338*c*. If desired, the bolts securing sheet stock 310 to jig 284 may be inserted and fastened after the apertures shown in FIG. 19 have been formed.

Figure 20:
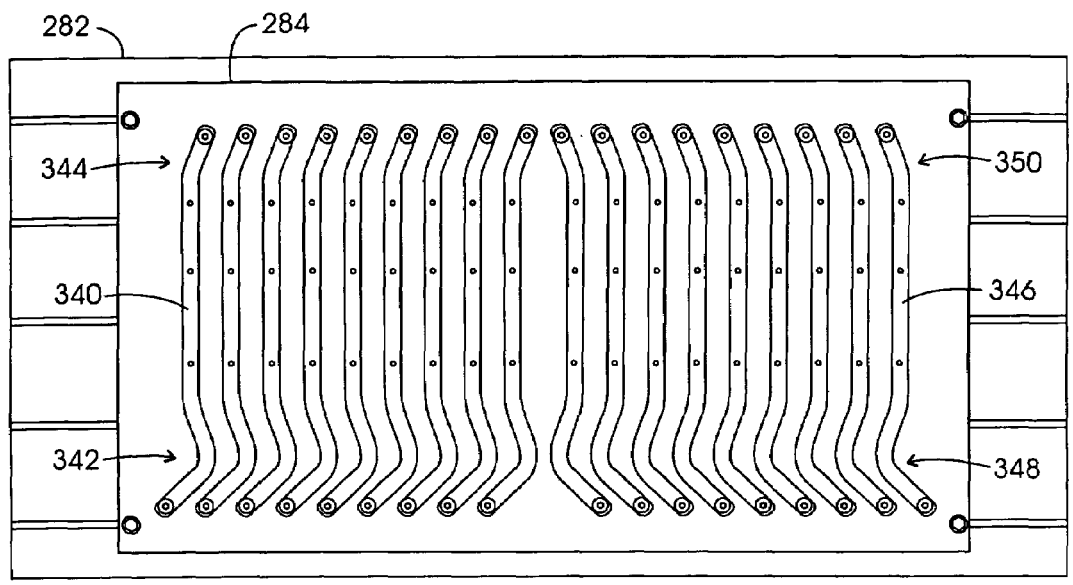
FIG. 20 is a top view of the apparatus shown in FIG. 19 after 9 right hand guards and 9 left hand guards have been cut from the sheet stock and excess material has been removed.

After the slots and apertures have been formed, the cutting procedure commences. Using miller 316, the hand guards are cut in the desired shape. During the cutting procedure, each hand guard is formed having at least one bend in the X-Y plane. More than one bend can be provided. For example, as shown in FIG. 20, each hand guard includes two bends, for example, at 342 and 344 in right hand guard 340 and 348 and 350 in left hand guard 346. As can be seen in FIG. 20, scrap sheet stock is removed and what remains are 9 pairs of hand guards, such as the hand guard illustrated in FIG. 14. Preferably, a plurality of handguards are formed in nested relationship and may be formed in slightly spaced apart relationship as shown.

Figure 21:
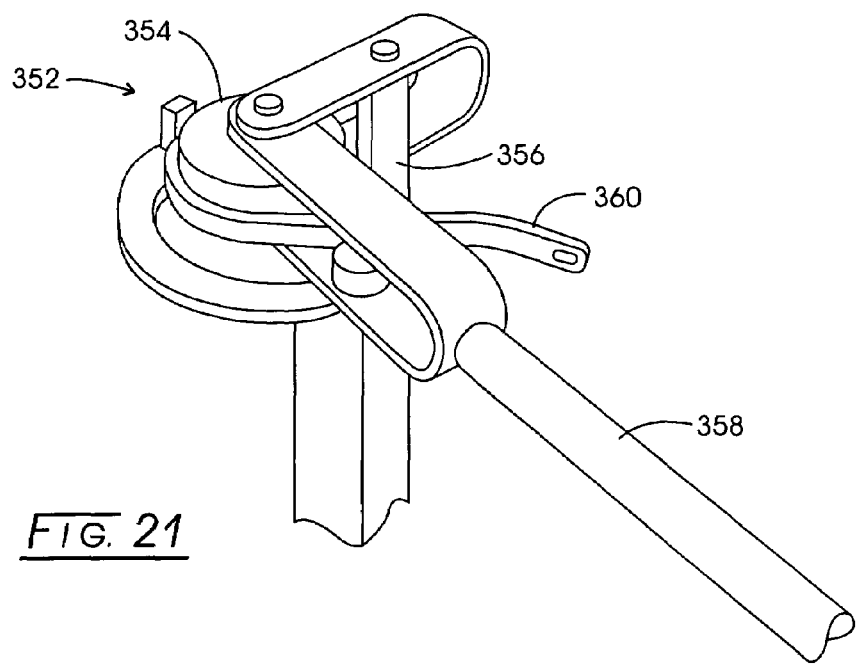
FIG. 21 is a perspective view of a bender for forming bends in the hand guards shown in FIG. 20 after they have been removed from the table.

Once the cutting procedure has been completed, the bolts are unfastened and the hand guards removed from table 282. A conventional bender, shown in FIG. 21 generally at 352, then is used to create one or more bends in the hand guards outside the X-Y plane. To form the desired radius, the bender die, 354, is pre-set. A hand guard, 360, then is inserted into the bender, against stop 356. and handle, 358 pulled to form the bend in hand guard 360. To form a second bend, if desired, either bender 352 may be re-set or a second bender may be provided that is configured to provide a bend of difference curvature. Bender 352 may be pneumatically, hydraulically, or electrically driven. Once the desired bends have been formed, the hand guards are complete and ready for use.

The sheet stock may be formed using metal, plastic, ceramic, or combinations thereof. Cutting one or more of the hand guard bends in the X-Y plane provides a structurally more robust part than if all of the bends were formed by bending. Additionally, when using the procedure outlined above, a stronger grade of material can be used to form the hand guard.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. A method for manufacturing an apertured handguard comprising the steps of:
   (a) providing a sheet stock having a surface lying in an X-Y plane and extending a given thickness along a Z-axis;
   (b) forming a pattern on said sheet stock surface, said pattern including the shape of said apertured handguard with at least one bend in said X-Y plane and the locations of one or more apertures to be formed through said apertured handguard;
   (c) forming said one or more apertures in said sheet stock at said locations through said given thickness in accordance with said pattern;
   (d) cutting along said surface and through said thickness with said cutting apparatus in accordance with said pattern to form a hand guard having said shape; and
   (e) bending said hand guard to form at least one bend in said Z-axis.

2. The method of claim 1, wherein said step (a) further comprises providing said sheet stock formed from one or more of metal or plastic.

3. The method of claim 2, wherein said step (a) further comprises providing said sheet stock formed from aluminum alloy.

4. The method of claim 1, wherein said step (d) further comprises providing a cutting apparatus capable of mechanical cutting.

5. The method of claim 1, wherein said step (d) further comprises providing a cutting apparatus capable of laser cutting.

6. The method of claim 1, wherein said step (d) further comprises cutting directed by computer numerical control apparatus.

7. The method of claim 1, wherein said step (e) further comprises bending said hand guard with a bender.

8. The method of claim 1, wherein said step (a) further comprises forming said pattern including the shapes of a nested plurality of said apertured handguards.

9. The method of claim 8, said step (a) further comprises forming said pattern wherein said nested plurality of apertured handguards are spaced apart.

* * * * *